Patented July 25, 1939

2,167,300

UNITED STATES PATENT OFFICE 2,167,300

WATERPROOFING SOLUTION FOR CEMENT AND STUCCO

William B. Houston, Alhambra, Calif.

No Drawing. Application November 3, 1936, Serial No. 109,062

3 Claims. (Cl. 134—78.5)

This invention relates to improvements in preparations for use in waterproofing concrete and stucco surfaces.

The present invention has for its primary object to provide a preparation which is adapted to be sprayed onto a cement, stucco or similar moisture absorbing surface and which will penetrate the material and form therein a water resistant and insoluble compound which will effectively prevent water from being taken up by the surface or working through the material of the same.

Another object of the invention is to provide a waterproofing composition of the above described character which forms an improvement upon prior Patent No. 1,942,601, in that it provides a preparation of greater water resisting qualities and longer life by reason of the fact that, because of the improved character, it will more deeply penetrate the material of concrete and stucco walls.

The preparation embodying the present invention consists of a mixture of a water solution of the sodium salt of a fatty acid and a varnish of either the hard or soft resin variety, together with certain solvents by which the mixing of the varnish and water solution is effected, and alcohol.

In preparing the present waterproofing preparation, a varnish of the ordinary oil type obtainable on the market is preferred, particularly such a varnish having the smallest quantity of oil. If a varnish is selected having an excessive amount of oil, the same will appear on the top of the preparation after it has stood and this excess oil may be skimmed off. It is also possible to use a spirit varnish, but since these are usually made of soft resins and oil varnishes are made with hard resins the oil varnish is preferred.

The varnish selected is mixed with or dissolved in a solvent or solvents, it being preferred to use naphtha and carbon tetrachloride and denatured alcohol. The varnish may be made to go into solution with the soap solution but the solvent or solvents referred to will effect a better and more rapid solution and will also help to keep the varnish in solution in a better condition for spraying.

In referring to denatured alcohol, the alcohol commonly sold on the market under this title is meant, such an alcohol comprising grain spirits having denaturants added thereto so that while it is entirely satisfactory for use in the arts, it is unfit for human consumption. Of course ordinary or pure grain alcohol might be used, if desired, or methyl alcohol could be used, but the denatured alcohol is preferred.

The sodium salt of the fatty acid referred to is sodium stearate and this is mixed with water to form a solution of approximately 120° C. and this solution is then cooled to approximately 75° C. and the varnish, solvent, and alcohol mixture is then added. This mixture is then thoroughly agitated and the same is ready for use. The best results are obtained by spraying the preparation in warmed or hot condition onto the wall surface to be waterproofed.

While no specific quantities have been set forth above for the preparation of the solution, the preferred formula comprises 5 percent sodium stearate soap, 2½ percent varnish, 7½ percent solvent mixture, 15 percent denatured alcohol, and 70 percent water.

Other suitable solvents might be employed in addition to or in combination with naphtha and carbon tetrachloride, such as methyl acetone, spirits of turpentine and amyl acetate.

The present composition improves over the prior one above referred to and other similar compositions in that the addition of resin varnishes helps to harden and crystallize the insoluble compound that is formed in the wall surface and, by the addition of the alcohol, the reaction of the solution in the concrete or stucco material is delayed, thereby allowing a much deeper penetration to take place. The hardening of the varnish and the sodium stearate soap together with the deep penetration of the material results in a waterproofing of the surface which will last for years and prevent moisture from penetrating the material of the surface and bringing about a checking and cracking such as ordinarily occurs in concrete and stucco structures.

While several solvents have been mentioned, the naphtha is preferred, and this may be used alone or it may be mixed with the other solvents, excepting the alcohol. If used alone, then it will constitute in itself approximately 7½ percent of the mixture, but if employed in association with the other solvents, such as the carbon tetrachloride, methyl acetone, etc., then the naphtha will be used in a proportion of two parts to one part of the other solvent selected, and this mixture will then be used in the proportion of 7½ percent to the entire mixture. The alcohol may be used in larger quantities if preferred, but experiment has demonstrated 15 percent alcohol gives satisfactory results.

I claim:

1. A waterproofing composition comprising a water solution of the sodium salt of stearic acid, a varnish, a solvent for the varnish, and alcohol to the extent of at least 15%.

2. A protective composition for cement, stucco and similar bodies, consisting of a mixture of a water solution of sodium stearate, a commercially prepared varnish thinned with a solvent for the contained resins which facilitates the miscibility of the liquids and facilitates the ready absorption of the mixture into said bodies, and approximately 15% alcohol.

3. A protective composition for cement, stucco and bodies of similar material, consisting of sodium stearate soap 5%, commercially prepared ready-to-use varnish 2½%, a solvent for the varnish with which the varnish is thinned 7½%, alcohol 15%, and water 70%.

WILLIAM B. HOUSTON.